United States Patent
Youm et al.

(10) Patent No.: US 10,008,888 B2
(45) Date of Patent: Jun. 26, 2018

(54) WIRELESS POWER TRANSMISSION SYSTEM CALCULATING THE BATTERY CHARGE STATE OF THE RECEIVER BASED ON THE SUPPLY IMPEDANCE OF THE POWER SOURCE AND THE SUMMED IMPEDANCE OF THE WIRELESS TRANSMITTER, WIRELESS RECEIVER, MEDIUM THEREBETWEEN, AND BATTERY CHARGE CIRCUIT

(71) Applicant: Electronics and Telecommunications Research Institute, Daejeon (KR)

(72) Inventors: WooSub Youm, Daejeon (KR); Sung Q Lee, Daejeon (KR); Gunn Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 324 days.

(21) Appl. No.: 14/335,822

(22) Filed: Jul. 18, 2014

(65) Prior Publication Data
US 2015/0207357 A1 Jul. 23, 2015

(30) Foreign Application Priority Data
Jan. 23, 2014 (KR) .................... 10-2014-0008463

(51) Int. Cl.
*H02J 7/02* (2016.01)
*H02J 7/00* (2006.01)
(Continued)

(52) U.S. Cl.
CPC ............. *H02J 50/80* (2016.02); *H02J 7/025* (2013.01); *H02J 7/042* (2013.01); *H02J 17/00* (2013.01);
(Continued)

(58) Field of Classification Search
CPC ................ H02J 50/15; H02J 7/025
(Continued)

(56) References Cited

U.S. PATENT DOCUMENTS

| 2,831,923 A | * | 4/1958 | Block | H04B 5/00 379/443 |
| 4,041,954 A | * | 8/1977 | Ohara | A61N 1/3787 128/908 |
| 4,209,783 A | * | 6/1980 | Ohyama | G01S 13/75 340/10.3 |

(Continued)

FOREIGN PATENT DOCUMENTS

| GB | 2307753 A | * | 6/1997 | ............. G01N 17/02 |
| GB | WO 9720220 A1 | * | 6/1997 | ............. G01N 17/02 |
| KR | 20100106536 A | * | 10/2010 | ........ H01J 37/32082 |

*Primary Examiner* — Robert Grant
*Assistant Examiner* — John Trischler

(57) ABSTRACT

Provided is a wireless power transmission system. The wireless power transmission system includes a power supply unit generating amplified power; a wireless power transmission unit receiving and converting the amplified power into wireless power; a wireless power reception unit receiving and converting the wireless power into charging power; and a charging unit receiving the charging power, wherein the charging unit includes a battery to store the charging power and the power supply unit includes a power detection unit identifies the charged state of the battery based on the amplified voltage and amplified current of the amplified power.

10 Claims, 10 Drawing Sheets

(51) Int. Cl.
*H02J 50/80* (2016.01)
*H02J 7/04* (2006.01)
*H02J 17/00* (2006.01)
H02J 50/10 (2016.01)
H02J 50/12 (2016.01)
H02J 50/15 (2016.01)

(52) U.S. Cl.
CPC .............. *H02J 50/10* (2016.02); *H02J 50/12* (2016.02); *H02J 50/15* (2016.02); *H02J 2007/0037* (2013.01)

(58) Field of Classification Search
USPC .......................... 320/108; 307/104; 367/135
See application file for complete search history.

(56) References Cited

U.S. PATENT DOCUMENTS

| | | | | |
|---|---|---|---|---|
| 4,580,041 A * | 4/1986 | Walton | ................ | G06K 7/0008 235/380 |
| 4,797,541 A * | 1/1989 | Billings | ................ | G06K 7/00 235/449 |
| 5,013,898 A * | 5/1991 | Glasspool | .......... | G06K 19/0723 235/449 |
| 5,118,997 A * | 6/1992 | El-Hamamsy | ..... | H05B 41/2806 315/248 |
| 5,137,020 A * | 8/1992 | Wayne | ................ | A61N 1/3708 607/29 |
| 5,620,474 A * | 4/1997 | Koopman | ............ | A61N 1/3708 607/29 |
| 5,666,058 A * | 9/1997 | Wakamatsu | ......... | G01N 27/023 324/445 |
| 6,173,899 B1 * | 1/2001 | Rozin | ................ | G06K 7/0008 235/449 |
| 6,809,498 B2 * | 10/2004 | Nakamura | ............. | G04C 10/00 320/108 |
| 6,879,246 B2 * | 4/2005 | Wuidart | ............... | G06K 7/0008 340/10.2 |
| 6,958,704 B2 * | 10/2005 | Vinegar | ................ | E21B 43/122 166/65.1 |
| 7,263,330 B2 * | 8/2007 | Wuidart | ................ | G06K 7/0008 340/10.1 |
| 7,521,890 B2 * | 4/2009 | Lee | ......... | H02J 5/005 320/108 |
| 7,868,482 B2 * | 1/2011 | Greene | ................ | H02J 1/10 307/82 |
| 7,893,564 B2 * | 2/2011 | Bennett | ................ | H02J 17/00 307/104 |
| 8,076,801 B2 * | 12/2011 | Karalis | ................ | H01Q 1/02 307/104 |
| 8,129,864 B2 * | 3/2012 | Baarman | ................ | H02J 5/005 307/104 |
| 8,212,414 B2 * | 7/2012 | Howard | ................ | B60L 11/182 307/104 |
| 8,310,108 B2 * | 11/2012 | Inoue | ................ | B60L 11/123 307/104 |
| 8,463,394 B2 | 6/2013 | Forsell | | |
| 8,463,395 B2 | 6/2013 | Forsell | | |
| 8,531,059 B2 | 9/2013 | Ichikawa et al. | | |
| 8,686,685 B2 * | 4/2014 | Moshfeghi | ............... | H02J 7/025 320/107 |
| 8,704,534 B2 * | 4/2014 | Kim | ................ | H02J 50/12 307/104 |
| 8,829,724 B2 * | 9/2014 | Ryu | ................ | H02J 5/005 307/104 |
| 8,829,728 B2 * | 9/2014 | Yamamoto | ............ | H02J 17/00 307/104 |
| 8,854,224 B2 * | 10/2014 | Kirby | ................ | H02J 7/025 340/636.1 |
| 8,872,385 B2 * | 10/2014 | Kinoshita | ............ | H02J 17/00 307/104 |
| 8,901,932 B2 * | 12/2014 | Hayman | ................ | G01V 3/24 324/324 |
| 8,901,933 B2 * | 12/2014 | Hayman | ................ | G01V 3/24 324/324 |
| 8,904,328 B2 * | 12/2014 | Terabe | ............... | G06F 17/5068 716/112 |
| 8,933,700 B2 * | 1/2015 | Hayman | ................ | G01V 3/24 324/347 |
| 8,994,377 B2 * | 3/2015 | Hayman | ............... | E21B 47/082 324/347 |
| 9,000,616 B2 * | 4/2015 | Greene | ..................... | H02J 1/10 307/82 |
| 9,001,622 B2 * | 4/2015 | Perry | .................... | H04B 11/00 320/107 |
| 9,037,418 B2 * | 5/2015 | Potyrailo | ................ | G01N 27/02 324/633 |
| 9,065,276 B2 * | 6/2015 | Kim | ..................... | H02H 3/20 |
| 9,094,110 B2 * | 7/2015 | Perry | .................... | H04B 11/00 |
| 9,094,111 B2 * | 7/2015 | Perry | .................... | H04B 11/00 |
| 9,094,112 B2 * | 7/2015 | Perry | .................... | H04B 11/00 |
| 9,124,122 B2 * | 9/2015 | Kim | ........................ | H02J 5/005 |
| 9,214,151 B2 * | 12/2015 | Perry | .................... | H04B 11/00 |
| 9,240,688 B2 * | 1/2016 | Hwang | ..................... | H02J 4/00 |
| 9,343,909 B2 * | 5/2016 | Tsuda | ..................... | H02J 17/00 |
| 2002/0032471 A1 * | 3/2002 | Loftin | ................ | A61N 1/37211 607/61 |
| 2007/0178857 A1 * | 8/2007 | Greene | ..................... | H02J 1/10 455/127.1 |
| 2008/0079392 A1 * | 4/2008 | Baarman | ............... | H02J 7/0072 320/108 |
| 2008/0197711 A1 * | 8/2008 | Kato | ...................... | H01F 38/14 307/104 |
| 2008/0252254 A1 * | 10/2008 | Osada | ............... | H01M 10/0436 320/108 |
| 2009/0174263 A1 * | 7/2009 | Baarman | ................ | H02J 5/005 307/104 |
| 2009/0243397 A1 * | 10/2009 | Cook | ...................... | H02J 5/005 307/104 |
| 2009/0284083 A1 * | 11/2009 | Karalis | ..................... | H01Q 1/02 307/104 |
| 2010/0007214 A1 * | 1/2010 | Howard | ................ | B60L 11/182 307/104 |
| 2010/0033021 A1 * | 2/2010 | Bennett | ..................... | H02J 17/00 307/104 |
| 2010/0034238 A1 * | 2/2010 | Bennett | ..................... | H02J 5/005 375/130 |
| 2010/0036773 A1 * | 2/2010 | Bennett | ............. | G06Q 20/3674 705/67 |
| 2010/0201316 A1 * | 8/2010 | Takada | ................ | B60L 11/182 320/108 |
| 2010/0225272 A1 * | 9/2010 | Kirby | ....................... | H04B 5/00 320/108 |
| 2010/0244579 A1 * | 9/2010 | Sogabe | ..................... | H02J 7/025 307/104 |
| 2010/0264746 A1 * | 10/2010 | Kazama | ..................... | H02J 7/025 307/104 |
| 2010/0289341 A1 * | 11/2010 | Ozaki | ..................... | H02J 7/025 307/104 |
| 2010/0295372 A1 * | 11/2010 | Hyde | ..................... | H02J 7/025 307/48 |
| 2011/0069516 A1 * | 3/2011 | Greene | ..................... | H02J 1/10 363/126 |
| 2011/0127848 A1 * | 6/2011 | Ryu | ...................... | H02J 5/005 307/104 |
| 2011/0148349 A1 | 6/2011 | Kim et al. | | |
| 2011/0156640 A1 * | 6/2011 | Moshfeghi | ............... | H02J 7/025 320/108 |
| 2011/0196452 A1 * | 8/2011 | Forsell | ..................... | H02J 7/025 607/60 |
| 2011/0199089 A1 * | 8/2011 | Hayman | ................ | G01V 3/24 324/347 |
| 2011/0199090 A1 * | 8/2011 | Hayman | ............... | E21B 47/082 324/356 |
| 2011/0241435 A1 * | 10/2011 | Saito | ..................... | H02J 5/005 307/104 |
| 2011/0241689 A1 * | 10/2011 | Hayman | ................ | G01V 3/24 324/355 |

(56) References Cited

U.S. PATENT DOCUMENTS

| | | | |
|---|---|---|---|
| 2011/0241690 A1* | 10/2011 | Hayman | G01V 3/24 324/355 |
| 2011/0248572 A1* | 10/2011 | Kozakai | H03F 1/565 307/104 |
| 2011/0266882 A1* | 11/2011 | Yamamoto | H02J 17/00 307/104 |
| 2011/0309687 A1* | 12/2011 | Bohori | E21B 33/0385 307/104 |
| 2012/0095531 A1* | 4/2012 | Derbas | A61N 1/0553 607/68 |
| 2012/0098348 A1* | 4/2012 | Inoue | B60L 11/123 307/104 |
| 2012/0116683 A1* | 5/2012 | Potyrailo | G01N 27/02 702/19 |
| 2012/0161538 A1* | 6/2012 | Kinoshita | H02J 17/00 307/104 |
| 2012/0175969 A1* | 7/2012 | Maughan | H01F 38/14 307/104 |
| 2012/0223573 A1* | 9/2012 | Schatz | H02J 5/005 307/9.1 |
| 2012/0223591 A1* | 9/2012 | Cheon | H02J 5/005 307/104 |
| 2012/0235509 A1* | 9/2012 | Ueno | H02J 5/005 307/104 |
| 2012/0242158 A1* | 9/2012 | Lee | H02J 5/005 307/104 |
| 2012/0293009 A1* | 11/2012 | Kim | H02H 7/1252 307/104 |
| 2012/0293118 A1* | 11/2012 | Kim | H02J 5/005 320/108 |
| 2012/0299540 A1* | 11/2012 | Perry | H04B 11/00 320/108 |
| 2012/0299541 A1* | 11/2012 | Perry | H04B 11/00 320/108 |
| 2012/0299542 A1* | 11/2012 | Perry | H04B 11/00 320/108 |
| 2012/0300588 A1* | 11/2012 | Perry | H04B 11/00 367/135 |
| 2012/0300592 A1* | 11/2012 | Perry | H04B 11/00 367/180 |
| 2012/0300593 A1* | 11/2012 | Perry | H04B 11/00 367/181 |
| 2012/0306269 A1* | 12/2012 | Kim | H02J 7/025 307/11 |
| 2012/0306286 A1* | 12/2012 | Kim | B60L 11/182 307/104 |
| 2012/0306433 A1* | 12/2012 | Kim | H02J 17/00 320/106 |
| 2013/0020876 A1* | 1/2013 | Kim | H02J 5/005 307/104 |
| 2013/0027078 A1* | 1/2013 | Nakano | H02J 5/005 324/764.01 |
| 2013/0043735 A1* | 2/2013 | Low | H04B 5/0012 307/104 |
| 2013/0119781 A1* | 5/2013 | Takada | B60L 11/182 307/104 |
| 2013/0154386 A1* | 6/2013 | Bae | H02J 17/00 307/104 |
| 2013/0176652 A1* | 7/2013 | Kim | H02H 3/20 361/86 |
| 2013/0234503 A1* | 9/2013 | Ichikawa | H02J 5/005 307/9.1 |
| 2013/0241301 A1* | 9/2013 | Maeda | H04B 5/0093 307/104 |
| 2013/0257167 A1 | 10/2013 | Singh | |
| 2013/0257370 A1* | 10/2013 | Ichikawa | H02J 5/005 320/108 |
| 2013/0271088 A1* | 10/2013 | Hwang | H02J 4/00 320/155 |
| 2013/0285467 A1* | 10/2013 | Takahashi | H01F 38/14 307/104 |
| 2013/0313893 A1* | 11/2013 | Ichikawa | H02J 17/00 307/9.1 |
| 2013/0342161 A1* | 12/2013 | Byun | H02J 7/025 320/108 |
| 2014/0025313 A1* | 1/2014 | Potyrailo | G01N 27/02 702/23 |
| 2014/0042821 A1* | 2/2014 | Boys | H02J 5/005 307/104 |
| 2014/0063666 A1* | 3/2014 | Kallal | H02J 7/0029 361/56 |
| 2014/0077614 A1* | 3/2014 | Park | H01F 38/14 307/104 |
| 2014/0077617 A1* | 3/2014 | Nakano | H04B 5/0037 307/104 |
| 2014/0077760 A1* | 3/2014 | Ichikawa | B60L 1/006 320/108 |
| 2014/0084701 A1* | 3/2014 | Bae | H02J 5/005 307/104 |
| 2014/0084858 A1* | 3/2014 | Kim | H02J 7/025 320/108 |
| 2014/0111153 A1* | 4/2014 | Kwon | H02J 7/025 320/108 |
| 2014/0184149 A1* | 7/2014 | Jung | H04B 5/0093 320/108 |
| 2014/0203758 A1* | 7/2014 | Moshfeghi | H02J 7/025 320/103 |
| 2014/0214395 A1* | 7/2014 | Valcore, Jr. | G06F 17/5063 703/14 |
| 2014/0225452 A1* | 8/2014 | Kozaki | H02J 7/025 307/104 |
| 2014/0253052 A1* | 9/2014 | Goma | H02J 7/00 320/166 |
| 2014/0282333 A1* | 9/2014 | Terabe | G06F 17/5068 716/112 |
| 2014/0300196 A1* | 10/2014 | Bunsen | H02J 7/025 307/104 |
| 2014/0312709 A1* | 10/2014 | Nakano | H02J 5/005 307/104 |
| 2014/0319923 A1* | 10/2014 | Lee | H02J 17/00 307/104 |
| 2014/0327319 A1* | 11/2014 | Byun | H04W 76/023 307/104 |
| 2014/0327409 A1* | 11/2014 | Lee | H02J 7/025 320/137 |
| 2014/0333145 A1* | 11/2014 | Lee | H02J 5/005 307/104 |
| 2014/0339906 A1* | 11/2014 | Miyamoto | H01F 38/14 307/104 |
| 2014/0339907 A1* | 11/2014 | Omae | H01F 38/14 307/104 |
| 2014/0339908 A1* | 11/2014 | Omae | H01F 38/14 307/104 |
| 2014/0361636 A1* | 12/2014 | Endo | H02J 5/005 307/104 |
| 2014/0375251 A1* | 12/2014 | Sakai | H02J 17/00 320/107 |
| 2015/0002103 A1* | 1/2015 | Tomiki | H02J 7/007 320/139 |
| 2015/0003207 A1* | 1/2015 | Lee | H02J 17/00 367/118 |
| 2015/0004906 A1* | 1/2015 | Iida | H04W 4/008 455/41.1 |
| 2015/0008755 A1* | 1/2015 | Sone | H02J 7/025 307/104 |
| 2015/0022145 A1* | 1/2015 | Kim | H02J 17/00 320/108 |
| 2015/0102680 A1* | 4/2015 | Menegoli | H02J 17/00 307/104 |
| 2015/0130292 A1* | 5/2015 | Yeon | G05F 1/62 307/104 |
| 2015/0171974 A1* | 6/2015 | Perry | H04B 11/00 307/104 |
| 2015/0177407 A1* | 6/2015 | Hayman | E21B 47/082 324/356 |
| 2015/0180265 A1* | 6/2015 | Chiang | H02J 7/025 320/108 |

(56) References Cited

U.S. PATENT DOCUMENTS

| | | | | |
|---|---|---|---|---|
| 2015/0185354 A1* | 7/2015 | Hayman | ............... | E21B 47/082 324/355 |
| 2015/0213791 A1* | 7/2015 | Perry | ................ | H04B 11/00 367/138 |
| 2015/0213792 A1* | 7/2015 | Perry | ................ | H04B 11/00 367/138 |
| 2015/0214764 A1* | 7/2015 | Perry | ................ | H04B 11/00 320/107 |
| 2015/0214765 A1* | 7/2015 | Perry | ................ | H04B 11/00 367/138 |
| 2015/0214927 A1* | 7/2015 | Greene | ................ | H02J 1/10 307/104 |
| 2015/0236544 A1* | 8/2015 | Uchida | ............... | H02J 7/025 343/860 |
| 2015/0244176 A1* | 8/2015 | Van Den Brink | ...... | H02J 5/005 307/104 |
| 2015/0249361 A1* | 9/2015 | Kim | ............... | H02H 3/20 320/108 |
| 2015/0270740 A1* | 9/2015 | Lee | ............... | H02J 7/025 320/108 |
| 2015/0280837 A1* | 10/2015 | Perry | ................ | H04B 11/00 307/104 |
| 2015/0312683 A1* | 10/2015 | Perry | ................ | H04B 11/00 367/135 |
| 2015/0326034 A1* | 11/2015 | Perry | ................ | H02J 5/005 307/104 |
| 2015/0326323 A1* | 11/2015 | Perry | ................ | H04B 11/00 367/135 |
| 2015/0333798 A1* | 11/2015 | Perry | ................ | G10K 11/346 320/108 |
| 2015/0333799 A1* | 11/2015 | Perry | ................ | G10K 11/346 320/108 |
| 2015/0333800 A1* | 11/2015 | Perry | ................ | G10K 11/346 320/108 |
| 2015/0349574 A1* | 12/2015 | Leabman | ................ | H02J 7/025 320/108 |
| 2015/0365066 A1* | 12/2015 | Tanomura | ............... | H02J 17/00 307/104 |
| 2016/0036265 A1* | 2/2016 | Kim | ............... | H02J 5/005 320/108 |
| 2016/0087456 A1* | 3/2016 | Shizuno | ................ | H01F 27/362 307/104 |
| 2016/0094042 A1* | 3/2016 | Maniktala | ............... | H02J 5/005 307/104 |
| 2016/0126749 A1* | 5/2016 | Shichino | ................ | H02J 5/005 307/104 |

\* cited by examiner

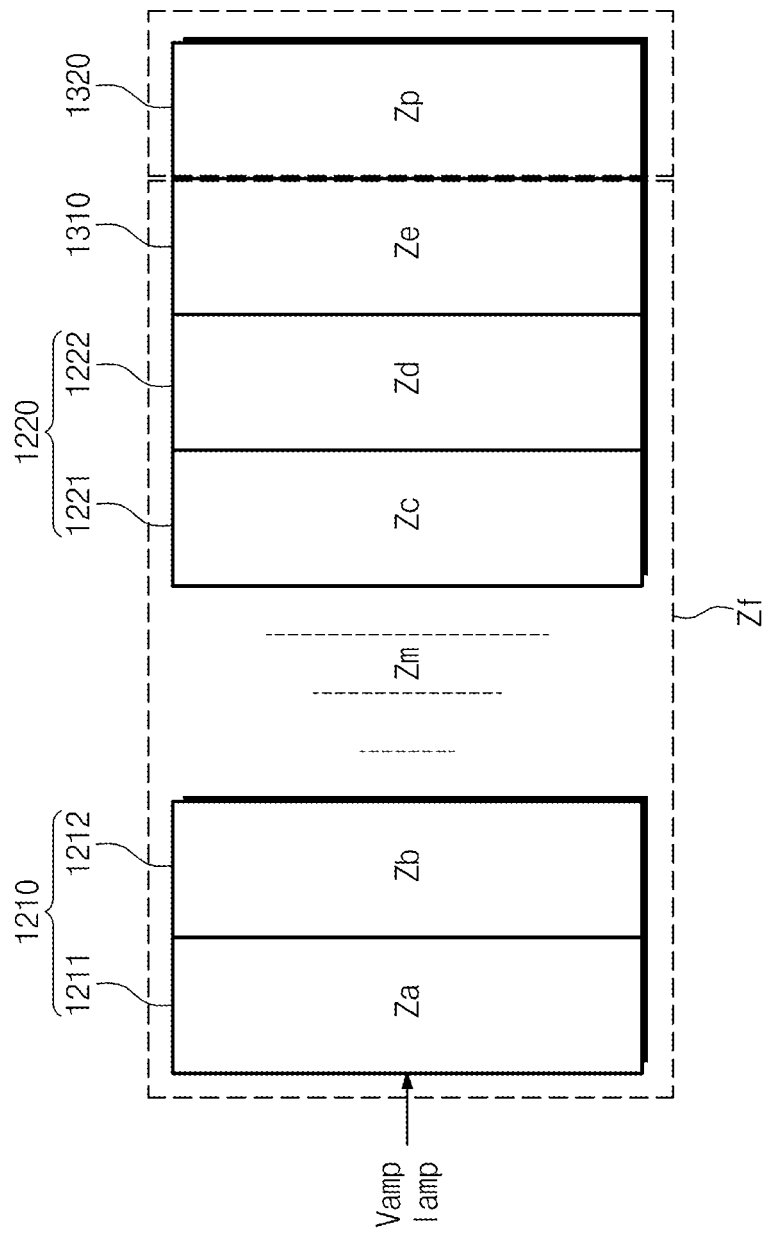

WIRELESS POWER TRANSMISSION SYSTEM CALCULATING THE BATTERY CHARGE STATE OF THE RECEIVER BASED ON THE SUPPLY IMPEDANCE OF THE POWER SOURCE AND THE SUMMED IMPEDANCE OF THE WIRELESS TRANSMITTER, WIRELESS RECEIVER, MEDIUM THEREBETWEEN, AND BATTERY CHARGE CIRCUIT

CROSS-REFERENCE TO RELATED APPLICATIONS

This U.S. non-provisional patent application claims priority under 35 U.S.C. § 119 of Korean Patent Application No. 10-2014-0008463, filed on Jan. 23, 2014, the entire contents of which are hereby incorporated by reference.

BACKGROUND OF THE INVENTION

The present invention disclosed herein relates to a wireless power transmission system, and more particularly, to a wireless power transmission device, a wireless power reception device and a wireless power transmission system that identify the charged state of a secondary cell.

There are roughly three wireless power transmission techniques. Firstly, there is a technique of transmitting power by using electromagnetic induction, secondly, there is a technique of transmitting power by using radio frequency, and thirdly, there is a technique of transmitting power by using an ultrasonic wave.

Firstly, a wireless power transmission system using electromagnetic induction includes a body generating charging power by using external power, and a power reception module receiving charging power from the body through electromagnetic induction. The electromagnetic induction has high efficiency and is closest to commercialization.

Secondly, the wireless power transmission system using RF collects RF energy that has a very long propagation distance, and supplies power to an electronic device or a sensor. There are many RFs in the air and they have an advantage in that their propagation distances are very long.

Thirdly, the wireless power transmission system using an ultrasonic wave includes a transmission device that generates an ultrasonic wave, and a reception device that receives a generated ultrasonic wave. Vibration generated from an ultrasonic device vibrates a medium by interaction with the medium and the ultrasonic wave is transmitted through a vibrating medium. Recently, a system that charges a battery by using such an ultrasonic wave generator has been disclosed.

However, the above-described wireless power transmission system has a limitation in that unnecessary power is transmitted to a secondary cell because the charged state of the secondary cell is not accurately identified.

SUMMARY OF THE INVENTION

The present invention provides a wireless power transmission device, a wireless power reception device and a wireless power transmission system that monitor the charged state of a secondary cell and prevent unnecessary over-charging of the secondary cell.

Embodiments of the present invention provide wireless power transmission systems include a power supply unit generating amplified power; a wireless power transmission unit receiving and converting the amplified power into wireless power; a wireless power reception unit receiving and converting the wireless power into charging power; and a charging unit receiving the charging power, wherein the charging unit includes a battery to store the charging power and the power supply unit includes a power detection unit identifies the charged state of the battery based on the amplified voltage and amplified current of the amplified power.

In other embodiments of the present invention, wireless power transmission devices include a power generation unit generating supply power; a power amplification unit amplifying the supply power to output amplified power; a wireless power transmission unit electrically connected to the power amplification unit, wherein the wireless power transmission unit receives and converts the amplified power into wireless power, and externally outputs the wireless power obtained through conversion; and a power detection unit adjusting the output of the wireless power based on the variations of the amplified voltage and amplified current of the amplified power output from the power amplification unit.

In still other embodiments of the present invention, wireless power transmission devices include a reference impedance circuit; a battery; a wireless power reception unit externally receiving wireless power, converting received wireless power into charging power, and outputting charging power; and a charging control unit electrically connected to the wireless power reception unit, wherein the charging control unit outputs the charging power to the battery in response to a first selection signal and outputs the charging power to the reference impedance circuit in response to a second selection signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 2 shows the impedance characteristic of the wireless power transmission system shown in FIG. 1;

DETAILED DESCRIPTION OF PREFERRED EMBODIMENTS

Figure 1:
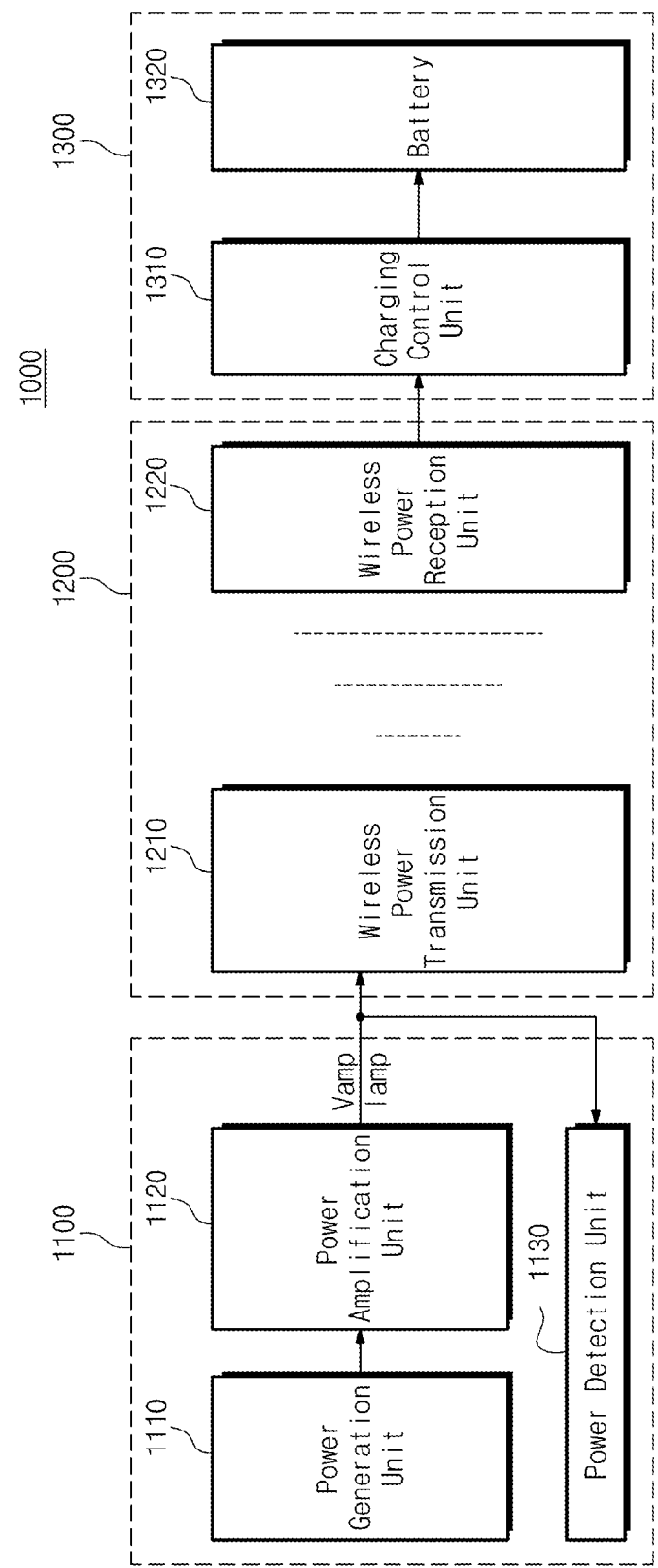
FIG. 1 is a block diagram of a wireless power transmission system according to an embodiment of the present invention.

Since the present invention may make various changes and have many forms, particular embodiments will be illustrated in the drawings and described in the detailed description in detail. However, the present invention is not intended to be limited to particular disclosed forms and it should be understood that the present invention covers all changes, equivalents, and replacements that fall within the spirit and technology of the present invention.

In describing each drawing, similar reference signs are used for similar components. In the accompanying drawings, the dimensions of structures are shown to be expanded than their actual dimensions for the clarity of the present invention. Although the terms a first and a second may be used to describe various components, these components should not be limited by these terms. The terms are used only in order to distinguish a component from another component. For example, without departing from the scope of rights of the present invention, a first component may be called a second component and similarly, the second component may also be called the first component. The terms in singular form may include the plural form unless otherwise specified.

In the present application, it should be understood that the terms "includes" and "has" indicate the presence of characteristics, numbers, steps, operations, components, parts or combinations thereof represented in the present disclosure but do not exclude the presence or addition of one or more other characteristics, numbers, steps, operations, components, parts or combinations thereof.

FIG. 1 is a block diagram of a wireless power transmission system according to an embodiment of the present invention. Referring to FIG. 1, a wireless power transmission system 1000 includes a power supply unit 1100, a wireless power unit 1200, and a charging unit 1300. In the embodiment, the wireless power transmission system 1000 may use an ultrasonic wave technique, an electromagnetic induction technique, and a magnetic resonance technique as a technique of transmitting wireless power but is not limited thereto.

The power supply unit 1100 generates an electrical signal required for transmitting wireless power. Specifically, the power supply unit 1100 includes a power generation unit 1110, a power amplification unit 1120, and a power detection unit 1130.

The power generation unit 1110 generates supply power required for transmitting wireless power.

As an example, the power generation unit 1110 may generate a sinusoidal alternating current (AC) signal as supply power.

The power amplification unit 1120 amplifies supply power generated from the power generation unit 1110 to a power level required for the operation of a wireless power transmission unit 1210. The power amplification unit 1120 transmits amplified power to the wireless power transmission unit 1210. In this example, the amplified power obtained by amplifying supply power may be implemented as a product of an amplified voltage Vamp and an amplified current Iamp.

Also, the power amplification unit 1120 transmits the amplified voltage Vamp and the amplified current Iamp to the power detection unit 1130.

The power detection unit 1130 receives the amplified voltage Vamp and the amplified current Iamp from the power amplification unit 1120. In the embodiment, the power detection unit 1130 may identify the charged state of a battery 1320 based on the amplified voltage Vamp and the amplified current Iamp. A method of identifying the charged state of the battery 1320 is described in detail through FIGS. 3A and 3B.

Figure 3A:
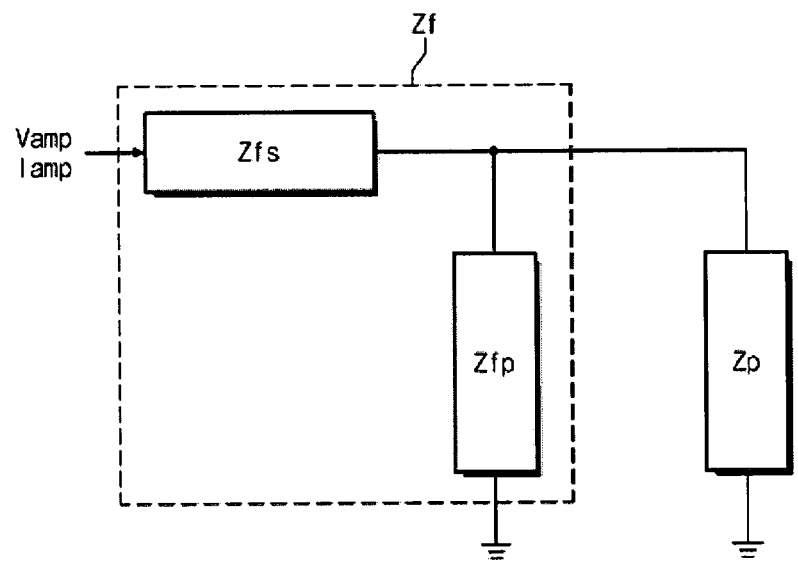
FIG. 3A is a circuit diagram showing a method of calculating the charged state of a battery shown in FIG. 2.
Figure 3B:
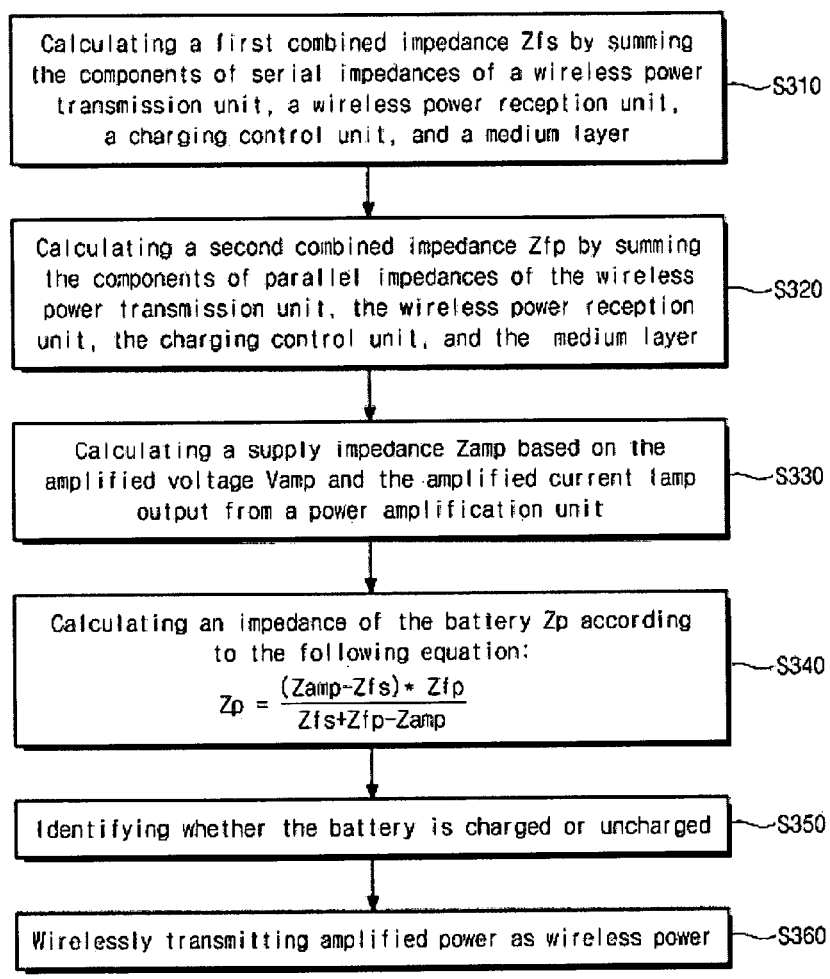
FIG. 3B is a flow chart of the method.

The wireless power unit 1200 generates charging power to be transmitted to the charging unit 1300 in response to the amplified power provided from the power supply unit 1100 (see, e.g., S360 of FIG. 3B). In describing the present invention, it is assumed that the wireless power unit 1200 transmits and receives wireless power having an ultrasonic signal form. However, the signal form used when the wireless power unit 1200 transmits wireless power is not limited to the ultrasonic wave signal and many forms may be used.

Specifically, the wireless power unit 1200 includes the wireless power transmission unit 1210 and a wireless power reception unit 1220. The wireless power transmission unit 1210 is electrically connected to the power amplification unit 1120 and receives the amplified power output from the power amplification unit 1120. The wireless power transmission unit 1210 converts amplified power that is an electrical signal, into an ultrasonic signal form through which wireless power may be transmitted.

A medium layer may be placed between the wireless power transmission unit 1210 and the wireless power reception unit 1220. For example, the medium layer may be formed of water, skin, metal and non-metal but is not limited thereto. Also, the wireless power transmission system 1000 shown in FIG. 1 may be implemented so that the medium layer is fixed.

That is, the medium layer in the wireless power transmission system 1000 may have an invariable fixed impedance value.

The wireless power transmission unit 1210 converts the amplified power into an ultrasonic signal and then transmits the ultrasonic signal obtained through the conversion to the wireless power reception unit 1220 through the medium layer.

The wireless power reception unit 1220 receives the ultrasonic signal transmitted through the medium layer. The wireless power reception unit 1220 generates charging power to be transmitted to the charging unit 1300 in response to the ultrasonic signal. That is, the wireless power reception unit 1220 converts the ultrasonic signal into charging power as an electrical signal and then transmits the charging power to the charging unit 1300.

The charging unit 1300 includes a charging control unit 1310 and the battery 1320. The charging control unit 1310 is electrically connected to the wireless power reception unit 1220 and receives charging power from the wireless power reception unit 1220. In this example, the charging power output from the wireless power reception unit 1220 may be an alternating current (AC) signal. Thus, the charging control unit 1310 converts AC charging power into direct current (DC) power. The charging control unit 1310 transmits DC charging power to the battery 1320.

The battery 1320 receives the charging power transmitted from the charging control unit 1310 and stores power required for the operation of a load.

FIG. 2 shows the impedance characteristic of the wireless power transmission system shown in FIG. 1.

Referring to FIGS. 1 and 2, the charged state of the battery 1320 may be identified according to amplified power output from the power amplification unit 1120 and the impedance characteristics of the wireless power unit 1200 and the charging unit 1300.

Specifically, the wireless power transmission unit 1210 includes a first wireless power conversion layer 1211 and a first matching layer 1212. The first wireless power conversion layer 1211 may be a layer generating an ultrasonic signal and have a first impedance Za value. The first matching layer 1212 may be a layer for being matched with the wireless power reception unit 1220 and have a second impedance Zb value. That is, the ultrasonic signal may be generated from the first wireless power conversion layer 1211 and transmitted to the medium layer through the first matching layer 1212. Also, the first matching layer 1212 is used to prevent a decrease in transmission efficiency of wireless power that is transmitted from the wireless power transmission unit 1210 to the wireless power reception unit 1220. To this end, the second impedance Zb of the first matching layer 1212 may be generated based on the impedance Zm of the medium layer.

The wireless power reception unit 1220 includes a second matching layer 1221 and a second wireless power conversion layer 1222. The second matching layer 1221 may be a layer for being matched with the wireless power transmission unit 1210 and have a third impedance Zc value. The second wireless power conversion layer 1222 may be a layer generating an electrical signal and have a fourth impedance Zd value. That is, the ultrasonic signal transmitted from the medium layer Zm is transmitted to the second wireless power conversion layer 1222 through the second matching layer 1221.

Likewise, the second matching layer 1221 is used to prevent a decrease in transmission efficiency of wireless power transmitted from the wireless power transmission unit 1210 to the wireless power reception unit 1220. To this end, the third impedance layer Zc may be set based on the impedance Zm of the medium layer.

The medium layer may be placed between the wireless power transmission unit 1210 and the wireless power reception unit 1220. The medium layer may be water or human beings' skin as described in FIG. 1 but it is assumed that the medium layer has a fixed impedance.

The charging control unit 1310 has a fifth impedance Ze value and the battery 1320 may have a sixth impedance Zp value.

Also, the sum of the impedances of the wireless power transmission unit 1210, the wireless power reception unit 1220, and the charging control unit 1310 is defined as a combined impedance Zf. That is, the combined impedance Zf may be set based on the sum of the impedances of the wireless power unit 1200 (see FIG. 1) and the charging control unit 1310.

FIG. 3A is a circuit diagram showing a method of calculating the charged state of the battery shown in FIG. 2, and FIG. 3B is a flow chart of the method.

In general, in order to increase the efficiency of wireless power transmission, it is important to prevent a decrease in the lifespan of the battery. However, since a typical wireless power transmission system may not identify the charged state of the battery, there is a limitation in that power is continuously supplied to the battery even after charging is completed. Thus, there is a waste of power and the lifespan of the battery may decrease.

In the embodiment, the wireless power transmission system 1000 (see FIG. 1) according to the present invention may calculate a supply impedance Zamp (see Equation 1 below) based on the amplified voltage Vamp and the amplified current Iamp output from the power amplification unit 1120 (see FIG. 1). Thus, the wireless power transmission system 1000 may calculate the sixth impedance Zp value of the battery 1320 (see FIG. 1) based on the supply impedance Zamp and the combined impedance Zf. Based on the sixth impedance Zp value, it is possible to identify the charged state of the battery 1320.

Referring to FIG. 3A, the combined impedance Zf includes a first combined impedance Zfs obtained by summing the components of serial impedances at S310 and a second combined impedance Zfp obtained by summing the components of parallel impedances at S320. The sixth impedance Zp may vary depending on the charged state of the battery 1320 (see FIG. 1).

Specifically, it is possible to calculate the sixth impedance Zp based on Equations 1 to 3 below.

$$Zamp = \frac{Vamp}{Iamp} \quad \langle \text{Equation 1} \rangle$$

Firstly, the power detection unit 1130 (see FIG. 1) may calculate the supply impedance Zamp based on the amplified voltage Vamp and the amplified current Iamp output from the power amplification unit 1120 with reference to Equation 1 at S330. Also, the supply impedance Zamp may be drawn as the sum of the combined impedance Zf and the sixth impedance Zp.

The power detection unit 1130 may calculate the supply impedance Zamp and calculate the sixth impedance Zp based on a calculation result of the calculated supply impedance Zamp and a preset combined impedance Zf. In this case, the combined impedance Zf may have a preset value because the medium layer has a fixed impedance value.

$$Zamp = Zfs + \left(\frac{Zfp \times Zp}{Zfp + Zp}\right) \quad \langle \text{Equation 2} \rangle$$

Referring to Equation 2, since the combined impedance Zf includes the first and second combined impedances Zfs and Zfp, the supply impedance Zamp may be calculated according to a calculation result of the first combined impedance Zfs, the second combined impedance Zfp and the sixth impedance Zp. In this example, the supply impedance based on Equation 1 is the same as the supply impedance based on Equation 2.

At S340, the sixth impedance may be calculated according to the following equation:

$$Zp = \frac{(Zamp - Zfs) \times Zfp}{Zfs + Zfp - Zamp} \quad \langle \text{Equation 3} \rangle$$

Referring to FIG. 3A, the power detection unit 1130 may calculate the sixth impedance Zp based on the calculation of the supply impedance Zamp and the first and second combined impedances Zfs and Zfp. That is, the sixth impedance Zp may be identified according to a calculation result of the supply impedance Zamp and the combined impedance Zf. Thus, the power detection unit 1130 may identify the charged state of the battery 1320 at S350 based on a calculation result of the supply impedance Zamp and the combined impedance Zf. This is because the sixth impedance Zp varies in response to the charged state of the battery 1320.

At S360, charging power is generated and transmitted to the charging unit in response to amplified power provided from the power supply unit.

Figure 4:
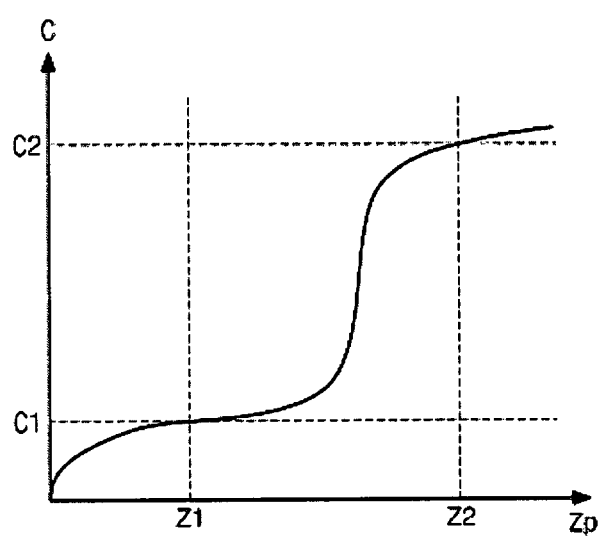
FIG. 4 is a graph showing a general secondary cell's impedance characteristic vs. a battery's charged state.

FIG. 4 is a graph showing a general secondary cell's impedance characteristic vs. a battery's charged state.

Referring to FIG. 4, the X axis represents the variation of the sixth impedance Zp (see FIG. 2) and the Y axis represents the charged state C of the battery 1320 (see FIG. 1). As shown in FIG. 4, the sixth impedance Zp may vary depending on the charged state of the battery 1320. Also, a completely discharged state C1 has a lower impedance than a completely charged state C2.

For example, as shown in FIG. 4, when it is assumed that the impedance of the completely discharged state C1 is Z1 and the impedance of the completely charged state C2 is Z2, Z2 is higher than Z1. That is, as the charged state of the battery 1320 increases, the sixth impedance Zp value increases, and as the charged state decreases, the sixth impedance Zp value decreases.

Figure 5A:
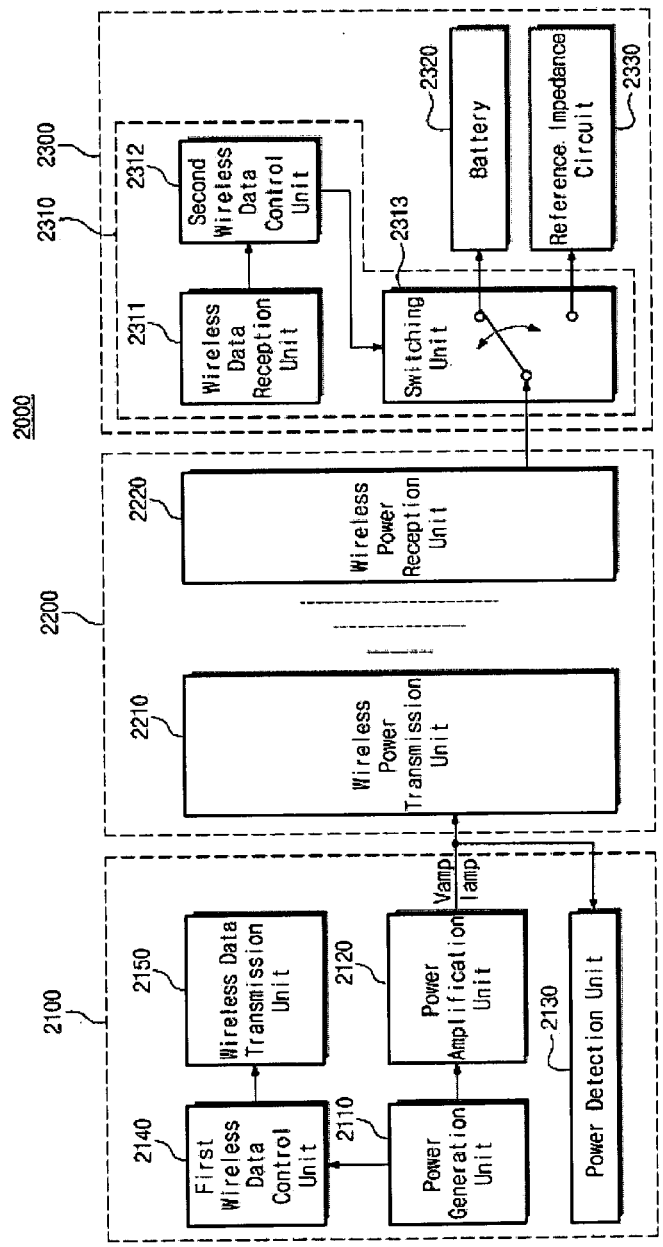
FIG. 5A is a block diagram of a wireless power transmission system according to another embodiment of the present invention.
Figure 5B:
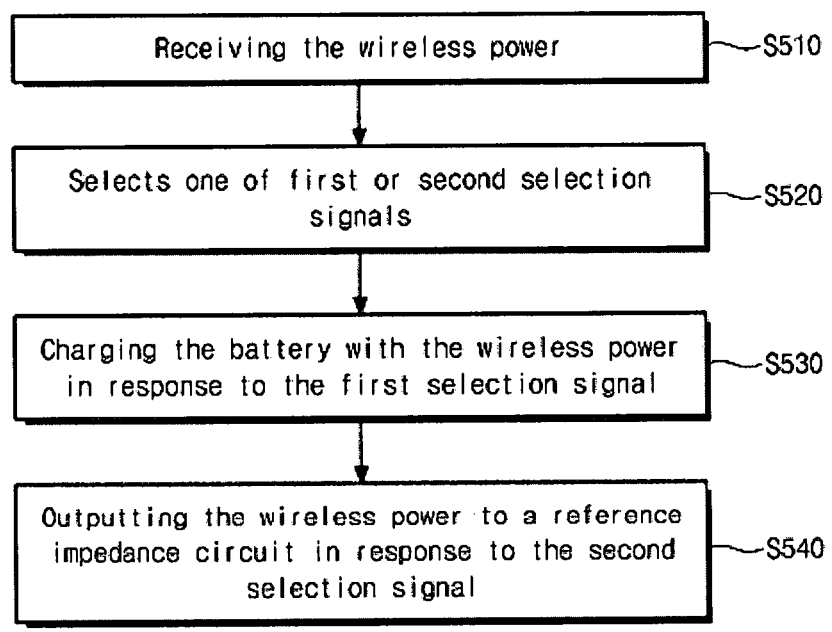
FIG. 5B is a flow chart of a method of the wireless power transmission system.

FIG. 5A is a block diagram of a wireless power transmission system according to another embodiment of the present invention, and FIG. 5B is a flow chart of a method of the wireless power transmission system.

The wireless power transmission system 1000 shown in FIG. 1 may have a unique impedance value because the medium layer is fixed. However, when the medium layer is not fixed and varies, the value of the combined impedance Zf may vary. That is, as the value of the combined impedance Zf varies, the value of the supply impedance Zamp (see Equation 1) through the charged state of the battery 1320 (see FIG. 1) may be identified may vary. For example, when the medium layer is not a material that has no variation in characteristic such as metal or water, but a medical device which is inserted into a human body, the impedance of the medium layer may continuously vary.

The wireless power transmission system 2000 according to the present invention may accurately identify the charged state of a battery 2320 when the impedance of the medium layer, i.e., the combined impedance Zf continuously varies.

Specifically, referring to FIG. 5A, a wireless power transmission system 2000 includes a power supply unit 2100, a wireless power unit 2200, and a charging unit 2300.

The power supply unit 2100 includes a power generation unit 2110, a power amplification unit 2120, a power detection unit 2130, a first wireless data control unit 2140, and a wireless data transmission unit 2150. The wireless power unit 2200 includes a wireless power transmission unit 2210, a wireless power reception unit 2220, and a medium layer. In this example, the power supply unit 2100 further includes the first wireless data control unit 2140 and the wireless data transmission unit 2150 in comparison with the power supply unit 1100 shown in FIG. 1. Since the operations of the power supply unit 2100 and the wireless power unit 2200 excluding the first wireless data control unit 2140 and the wireless data transmission unit 2150 are the same as those of the power supply unit 1100 and the wireless power unit 2200 shown in FIG. 1, descriptions of them are left out.

The charging unit 2300 includes a charging control unit 2310, the battery 2320 and a reference impedance circuit 2330. The charging unit 2300 further includes a wireless data reception unit 2311, a second wireless data control unit 2312, a switching unit 2313, and a reference impedance circuit 2330 in comparison with the charging unit 1300 shown in FIG. 1 and the battery 2320 is the same configuration as the battery 1320.

The first wireless data control unit 2140 receives supply power output from the power generation unit 2110 at S510. The first wireless data control unit 2140 generates a connect signal to be provided to the wireless data transmission unit 2150 in response to the supply power. In this example, the connect signal may be regularly generated and may be generated when an amplified voltage Vamp and an amplified current Iamp vary. The wireless data transmission unit 2150 receives the connect signal from the first wireless data control unit 2140 and transmits a received connect signal to the wireless data reception unit 2311. In this example, the connect signal may be a control signal that is used to connect an electrical signal to any one of the battery 2320 and the reference impedance circuit 2330 that are included in the charging unit 2300.

The charging control unit 2310 includes the wireless data reception unit 2311, the second wireless data control unit 2312, and the switching unit 2313. The wireless data reception unit 2311 receives the connect signal from the wireless data transmission unit 2150 and transmits a received connect signal to the second wireless data control unit 2312. In response to the connect signal, the second wireless data control unit 2312 selects any one of first or second selection signals to control the operation of the switching unit 2313 at S520. Also, it is described that the charging control unit 2310 includes the wireless data reception unit 2311, the second wireless data control unit 2312, and the switching unit 2313 but is not limited thereto.

That is, additional components in the charging unit 2300 excluding the battery 2320 and the reference impedance circuit 2330 may be included in the charging control unit 2310.

For example, the switching unit 2313 may provide amplified power provided from the wireless power reception unit 2220 to the battery 2320 in response to a first selection signal at S530. Also, the switching unit 2313 may provide amplified power provided from the wireless power reception unit 2220 to the reference impedance circuit 2330 in response to a second selection signal at S540.

Also, in the embodiment, although FIG. 5A shows a single reference impedance circuit 2330, the reference impedance circuit is not limited thereto and may be configured in plural forms. That is, as the reference impedance circuit 2330 is configured in plural forms, it is possible to obtain the accurate value of the combined impedance Zf (see FIG. 6) depending on the variation of a medium layer. For example, the second wireless data control unit 2312 may generate the second selection signal to select any one of a plurality of reference impedance circuits.

The reference impedance circuit 2330 is used to find the value of the combined impedance Zf depending on the variation of the impedance Zm (see FIG. 2) of the medium layer. The power detection unit 2130 may calculate the sixth impedance Zp (see FIG. 6) value of the battery 2320 based on the value of the combined impedance Zf. Accordingly, it is possible to identify the charged state of the battery 2320.

Figure 6:
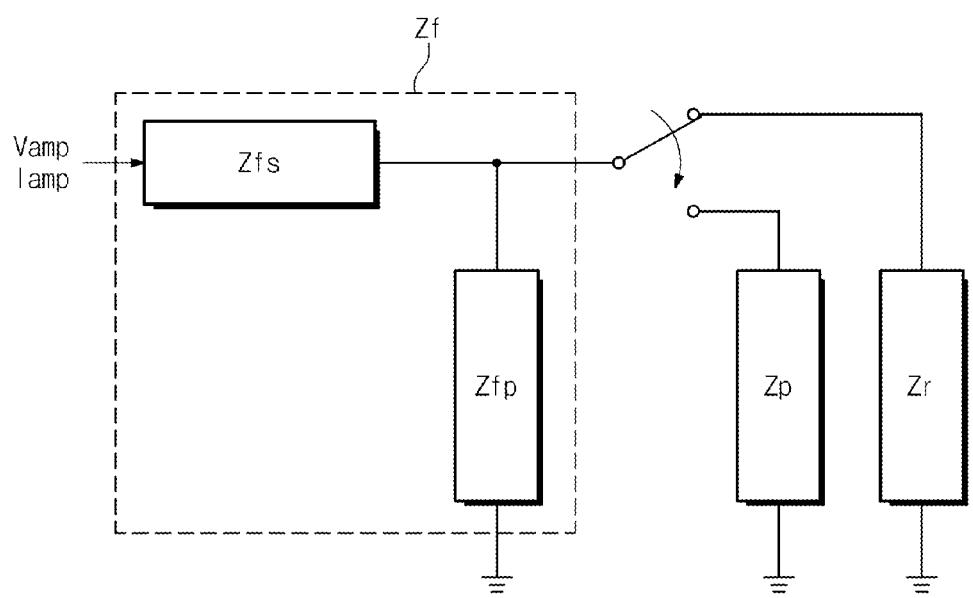
FIG. 6 is a circuit diagram showing a method of calculating the charged state of a battery shown in FIG. 5A.

FIG. 6 is a circuit diagram showing a method of calculating the charged state of the battery shown in FIG. 5A.

Referring to FIGS. 5A and 6, in response to the second selection signal output from the second wireless data control unit 2312, the switching unit 2313 provides charging power to the reference impedance circuit 2330. In the embodiment, the reference impedance circuit 2330 may have a reference impedance Zr that is previously provided in a manufacturing step. The power detection unit 2130 may calculate the value of the combined impedance Zf based on the values of the supply impedance Zamp (see Equation 1) and a reference impedance Zr.

Specifically, the power detection unit 2130 may calculate the supply impedance Zamp based on the amplified voltage Vamp and the amplified current Iamp with reference to Equation 1 described above with reference to FIGS. 3A and 3B. When charging power is provided to the reference impedance circuit 2330, the supply impedance Zamp may be calculated as the sum of the combined impedance Zf and the reference impedance Zr. Since the value of the reference impedance Zr is previously provided, the power detection unit 2130 may calculate the value of the combined impedance Zf based on a calculation result of the calculated supply impedance Zamp and the reference impedance Zr.

Then, in response to the first selection signal output from the second wireless data control unit 2312, the switching unit 2313 provides charging power to the battery 2320. After the value of the combined impedance Zf is calculated, the power detection unit 2130 may calculate the sixth impedance Zp of the battery 2320 based on a calculation of the supply impedance Zamp and the combined impedance Zf.

As described above, the wireless power transmission system 2000 according to the present invention may accurately identify the charged state of the battery 2320 even if the impedance Zm value of the medium layer varies. Accordingly, it is possible to prevent unnecessary power from becoming supplied after the charging of the battery 2320 is completed.

Figure 7:
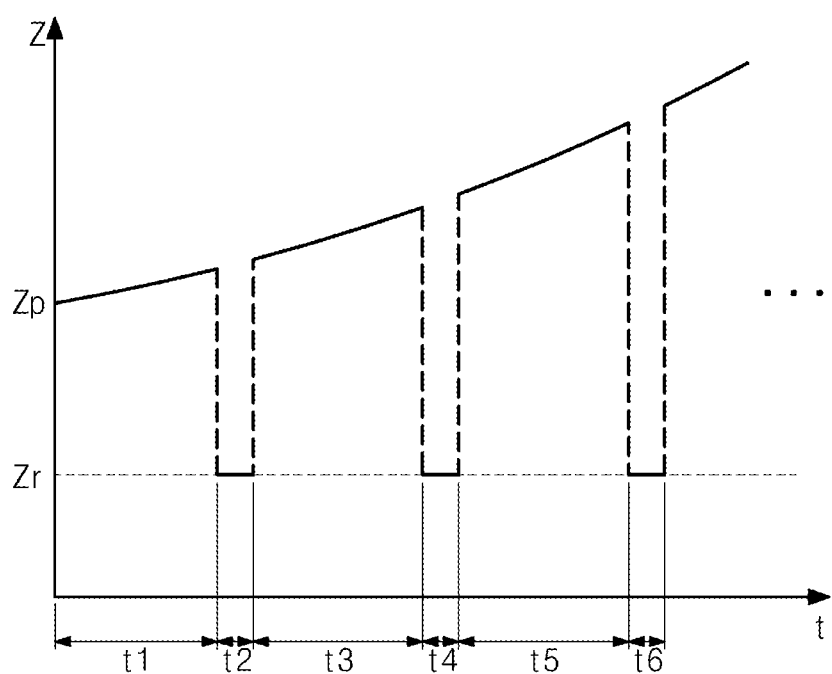
FIG. 7 is a graph showing how power is charged in the battery shown in FIG. 6.

FIG. 7 is a graph showing how power is charged in the battery shown in FIG. 6.

Referring to FIGS. 5 and 7, the X axis of a graph shown in FIG. 7 represents the charging time t of the battery 2320 and the Y axis represents the sixth impedance Zp or the reference impedance Zr according to any one of the first or the second selection signals.

Specifically, in response to the first selection signal output from the second wireless data control unit 2312, the switching unit 2313 provides amplified power to the battery 2320 (see FIG. 6) at a first time t1. As a result, the sixth impedance Zp may increase.

Then, in response to the second selection signal output from the second wireless data control unit 2312, the switching unit 2313 provides amplified power to the reference impedance circuit 2330 (see FIG. 6) at a second time t2. As a result, amplified power is provided to the reference impedance Zr. In this case, the power detection unit 2130 calculates the combined impedance Zf based on the reference impedance Zr and the supply impedance Zamp.

In response to the first selection signal output from the second wireless data control unit 2312, the switching unit 2313 again provides charging power to the battery 2320 at a third time t3. In this case, the power detection unit 2130 may calculate the value of the sixth impedance Zp based on the combined impedance Zf and the supply impedance Zamp. That is, the power detection unit 2130 identifies the charged state of the battery 2320 based on the value of the sixth impedance Zp.

Then, the operations performed at the first to third times t1 to t3 may be repeated. That is, as the impedance of the medium layer varies, the power detection unit 2130 identifies the value of the combined impedance Zf by using the reference impedance Zr and then calculates the value of the sixth impedance Zp.

Figure 8:
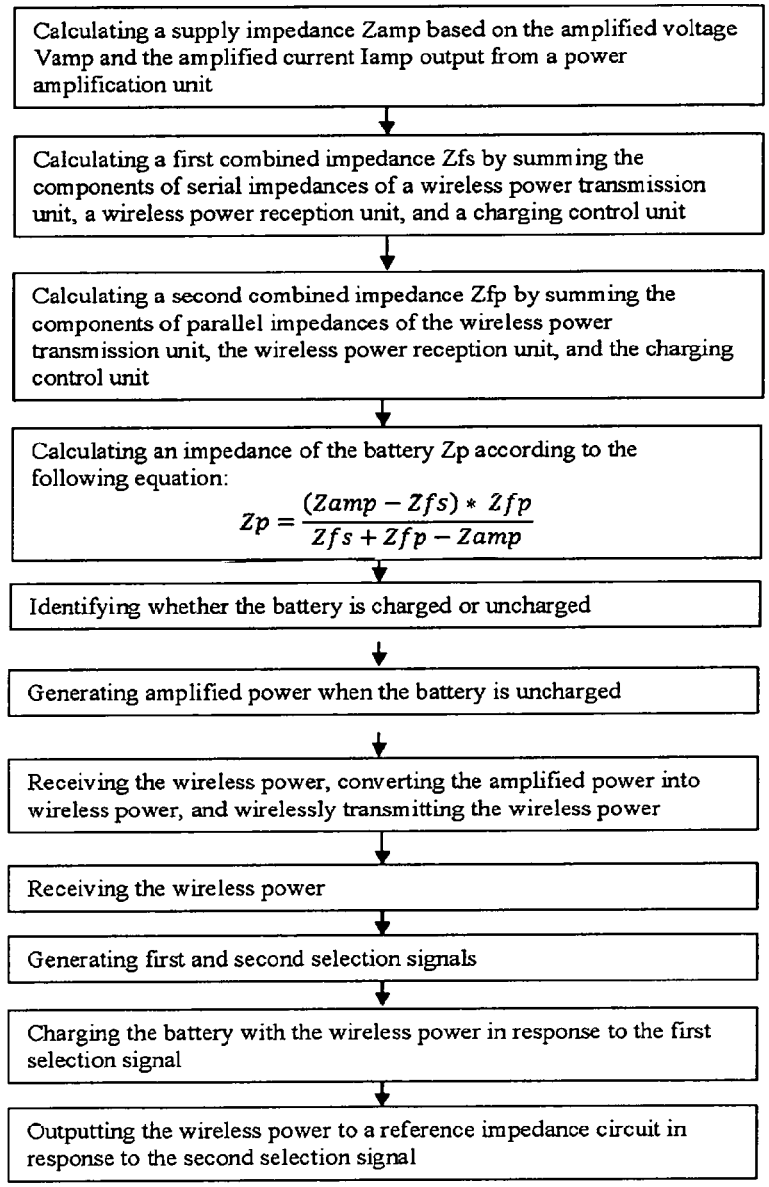
FIG. 8 is a block diagram of a wireless power transmission system according to another embodiment of the present invention.

FIG. 8 is a block diagram of a wireless power transmission system according to another embodiment of the present invention.

Referring to FIG. 8, a wireless power transmission system 3000 according to the present invention may identify the charged state of the battery 2320 without wireless data communication in comparison with the wireless power transmission system 2000 shown in FIG. 5A.

Specifically, referring to FIG. 8, the wireless power transmission system 3000 includes a power supply unit 3100, a power transmission unit 3200, and a charging unit 3300.

The power supply unit 3100 includes a power generation unit 3110, a power amplification unit 3120, and a power detection unit 3130. The power transmission unit 3200 includes a wireless power transmission unit 3210 and a wireless power reception unit 3220. Since the power supply unit 3100 and the power transmission unit 3200 are the same configurations and operations as the power supply unit 1100 and the wireless power unit 1200 shown in FIG. 1, descriptions of them are left out.

The charging unit 3300 includes a charging control unit 3310, a battery 3320, and a reference impedance circuit 3330. The charging control unit 3310 includes a switching control unit 3311 and a switching unit 3312. The switching control unit 3311 alternately provides first and second selection signals to the switching unit 3312 according to a preset period. Also, the charging control unit 3310 includes the switching control unit 3311 and the switching unit 3312 but is not limited thereto. That is, additional components included in the charging unit 3300 excluding the battery 3320 and the reference impedance circuit 3330 may be included in the charging control unit 3310.

The switching unit 3312 receives any one of the first and second selection signals from the switching control unit 3311. Specifically, the switching unit 3312 is electrically connected to the battery 3320 when the first selection signal is received. Then, the switching unit 3312 provides amplified power to the battery 3320. Also, when the second selection signal is received, the switching unit 3312 is electrically connected to the reference impedance circuit 3330. Then, the switching unit 3312 provides amplified power to the reference impedance circuit 3330.

Like when calculating the sixth impedance Zp described in FIG. 7, the power detection unit 3130 may identify the charged state of the battery 3320. Thus, how to calculate the sixth impedance Zp is left out.

Also, in the embodiment, although FIG. 8 shows a single reference impedance circuit 3330, the reference impedance circuit is not limited thereto and may be configured in plural forms. That is, since the reference impedance circuit 3330 is configured in plural forms, it is possible to obtain the accurate value of the combined impedance Zf (see FIG. 6) depending on the variation of the medium layer.

By monitoring the charged state of a secondary cell, the wireless power transmission system according to the present invention may prevent unnecessary over-charging of the secondary cell. Thus, the lifespan of the secondary cell may increase.

Best embodiments are described in the drawings and the disclosure as described above. Although specific terms are used herein, they are only intended to describe the present invention and are not intended to limit meanings or the scope of the present invention described in the following claims. Therefore, a person skilled in the art may understand that various variations and equivalent embodiments may be implemented. Thus, the true protective scope of the present invention will be defined by the technical spirit of the following claims.

What is claimed is:

1. A method comprising:
generating, by a power supply unit, amplified power when a battery is uncharged;
identifying, by the power supply unit, whether the battery is charged or uncharged;
receiving, by a wireless power transmission unit, the amplified power;
converting, by the wireless power transmission unit, the amplified power into wireless power;

wirelessly transmitting, by the wireless power transmission unit, the wireless power;
receiving, by a wireless power reception unit, the wireless power;
converting, by the wireless power reception unit, the wireless power into charging power; and
receiving, by a charging unit, the charging power, the charging unit including the battery and a charging control unit; and
charging, by the charging unit, the battery by the charging power,
wherein identifying whether the battery is charged or uncharged includes:
determining a supply impedance according to the following Equation 1:

$$Zamp = \frac{Vamp}{Iamp}$$

where Zamp is the supply impedance, Vamp is an amplified voltage of the amplified power, and Iamp is an amplified current of the amplified power;
determining a combined impedance based on an impedance of the wireless power transmission unit, an impedance of the wireless power reception unit, and an impedance of the charging unit;
determining a serial component of the combined impedance;
determining a parallel component of the combined impedance;
determining an impedance of the battery according to the following equation:

$$Zp = \frac{(Zamp - Zfs) * Zfp}{Zfs + Zfp - Zamp},$$

where Zp is the impedance of the battery, Zfs is the serial component of the combined impedance, and Zfp is the parallel component of the combined impedance; and
determining a charged state of the battery based on the impedance of the battery.

2. The method of claim 1, further comprising:
generating, by the power supply unit, supply power; and
generating, by the power supply unit, the amplified power by amplifying the supply power.

3. The method of claim 1, the method further comprising:
generating, by the charging control unit, first and second selection signals; and
outputting, by the charging control unit, the charging power to any one of the battery and a reference impedance circuit in response to the first and second selection signals,
wherein the charging unit comprises:
the reference impedance circuit; and
the charging control unit, the charging control unit being electrically connected to the wireless power reception unit.

4. The method of claim 3,
wherein the charging power is connected to one of a plurality of reference impedance circuits in response to the first selection signal, the reference impedance circuit including the plurality of reference impedance circuits, the plurality of reference impedance circuits having different impedance values.

5. The method of claim 3, wherein
the first and second selection signals are generated by a switching control unit, and
wherein the charging power is provided to any one of the battery and the reference impedance circuit in response to the first or second selection signal by a switching unit.

6. The method of claim 3, further comprising:
prestoring information on the reference impedance circuit.

7. The method of claim 1, the supply impedance being a first supply impedance, the method further comprising:
connecting, by a switching unit, the charging power to a reference impedance circuit;
determining, by the power supply unit, a second supply impedance based on the amplified power when the charging power is connected to the reference impedance circuit; and
determining, by the power supply unit, the combined impedance based on an impedance of the reference impedance circuit and the second supply impedance,
wherein charging the battery by the charging power includes connecting, by the switching unit, the charging power to the battery.

8. The method of claim 7, wherein determining the impedance of the battery includes subtracting the combined impedance from the first supply impedance, and
wherein determining the combined impedance includes subtracting the impedance of the reference circuit from the second supply impedance.

9. The method of claim 7, wherein connecting the charging power to the battery includes receiving, by the switching unit, a first selection signal, and
wherein connecting the charging power to the reference impedance circuit includes receiving, by the switching unit, a second selection signal.

10. The method of claim 7, wherein connecting the charging power to the battery includes transmitting, by the wireless power transmission unit, a first connect signal, and
wherein connecting the charging power to the reference impedance circuit includes transmitting, by the wireless power transmission unit, a second connect signal.

* * * * *